(12) United States Patent
Peacock et al.

(10) Patent No.: US 10,730,428 B2
(45) Date of Patent: *Aug. 4, 2020

(54) CAMERA LIGHT

(71) Applicant: Pro-Vision Inc., Byron Center, MI (US)

(72) Inventors: Stephen Thomas Peacock, Kentwood, MI (US); Elizabeth Jane Peacock, Kentwood, MI (US)

(73) Assignee: Pro-Vision Solutions, LLC, Byron Center, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,866

(22) Filed: Aug. 2, 2019

(65) Prior Publication Data

US 2019/0351815 A1 Nov. 21, 2019

Related U.S. Application Data

(63) Continuation of application No. 15/346,379, filed on Nov. 8, 2016, now Pat. No. 10,414,324, which is a continuation of application No. 13/374,433, filed on Dec. 28, 2011, now Pat. No. 9,497,421, which is a continuation of application No. 12/181,058, filed on Jul. 28, 2008, now abandoned.

(Continued)

(51) Int. Cl.
*G03B 17/00* (2006.01)
*B60Q 1/00* (2006.01)
*H04N 7/18* (2006.01)
*B60R 11/04* (2006.01)
*G03B 15/03* (2006.01)
*G03B 17/56* (2006.01)
*H04N 5/225* (2006.01)

(52) U.S. Cl.
CPC ............ *B60Q 1/0023* (2013.01); *B60R 11/04* (2013.01); *G03B 15/03* (2013.01); *G03B 17/561* (2013.01); *H04N 5/2252* (2013.01); *H04N 5/2254* (2013.01); *H04N 5/2256* (2013.01); *H04N 7/18* (2013.01); *B60R 2300/103* (2013.01)

(58) Field of Classification Search
USPC ....................................................... 396/427
See application file for complete search history.

(56) References Cited

U.S. PATENT DOCUMENTS 3,885,091 A   5/1975   Fish et al.
3,958,080 A   5/1976   Schadler
(Continued)

OTHER PUBLICATIONS

US 2,971,529 A, 02/1961, Hahnau et al. (withdrawn)
New Way Scranton MFG. Co. Inc., "Viper," Magazine, Dec. 2003, 1 page.

*Primary Examiner* — Rodney E Fuller
(74) *Attorney, Agent, or Firm* — Price Heneveld LLP

(57) ABSTRACT

A camera light assembly includes a camera assembly and a marker light assembly. The camera assembly includes a body and a lens positioned at a forward portion of the body. The marker light assembly includes a light housing having an aperture extending therethrough. The body of the camera assembly is elongated and is received within the aperture of the light housing of the marker light assembly. Camera lock rings are utilized to releasably secure the camera assembly to the marker light assembly.

20 Claims, 4 Drawing Sheets

Related U.S. Application Data

(60) Provisional application No. 60/952,106, filed on Jul. 26, 2007.

(56) References Cited

U.S. PATENT DOCUMENTS

| | | |
|---|---|---|
| 5,089,895 A | 2/1992 | Fraker et al. |
| 5,642,238 A | 6/1997 | Sala |
| 6,100,921 A | 8/2000 | Rowley |
| 6,115,060 A | 9/2000 | Rowley |
| 6,151,065 A | 11/2000 | Steed |
| 6,259,475 B1 | 7/2001 | Ramachandran et al. |
| 6,491,417 B1 | 12/2002 | Haen et al. |
| 6,509,832 B1 | 1/2003 | Bauer et al. |
| 6,550,949 B1 | 4/2003 | Bauer et al. |
| 6,663,260 B1 | 12/2003 | Tieszen |
| 6,672,745 B1 | 1/2004 | Bauer et al. |
| 6,703,925 B2 | 5/2004 | Steffel |
| 6,741,286 B2 | 5/2004 | Meek et al. |
| 6,757,109 B2 | 6/2004 | Bos |
| 6,799,639 B2 | 10/2004 | Sato et al. |
| 6,977,584 B2 | 12/2005 | Milliken |
| 7,111,968 B2 | 9/2006 | Bauer et al. |
| 7,292,281 B2 | 11/2007 | Cheng |
| 7,319,226 B2 | 1/2008 | Huang |
| 7,568,823 B2 | 8/2009 | Bauer et al. |
| 7,593,056 B2 | 9/2009 | Wubs |
| 8,308,637 B2 | 11/2012 | Ishigami et al. |
| 9,497,412 B1 | 11/2016 | Peacock et al. |
| 10,414,324 B2 * | 9/2019 | Peacock .................. B60R 11/04 |
| 2002/0003571 A1 | 1/2002 | Schofield et al. |
| 2002/0044435 A1 | 4/2002 | Pohlert et al. |
| 2003/0030180 A1 | 2/2003 | Meek et al. |
| 2003/0030745 A1 | 2/2003 | Meek et al. |
| 2003/0090569 A1 | 5/2003 | Poechmueller |
| 2003/0227546 A1 | 12/2003 | Hilborn et al. |
| 2004/0201463 A1 | 10/2004 | Ko |
| 2004/0233284 A1 | 11/2004 | Lesesky et al. |
| 2005/0046696 A1 | 3/2005 | Lang et al. |
| 2005/0093684 A1 | 5/2005 | Cunnien |
| 2005/0146641 A1 | 7/2005 | Cheng |
| 2005/0206780 A1 | 9/2005 | Iwasaki et al. |
| 2005/0253923 A1 | 11/2005 | Komori et al. |
| 2006/0056077 A1 | 3/2006 | Johnston |
| 2006/0061655 A1 | 3/2006 | Wang |
| 2006/0087583 A1 | 4/2006 | Wubs |
| 2006/0132600 A1 | 6/2006 | Chretien |
| 2006/0163481 A1 | 7/2006 | Huang |
| 2006/0210256 A1 | 9/2006 | Fukui et al. |
| 2007/0216770 A1 | 9/2007 | Chang |
| 2007/0253211 A1 | 11/2007 | Chang |
| 2008/0099700 A1 | 5/2008 | Frenzel et al. |
| 2008/0266393 A1 | 10/2008 | Park |
| 2008/0266445 A1 | 10/2008 | Park |
| 2008/0278581 A1 | 11/2008 | Inoue |
| 2009/0051515 A1 | 2/2009 | Fujinawa |
| 2009/0096869 A1 | 4/2009 | Huang |
| 2009/0310342 A1 | 12/2009 | Chang |
| 2010/0060733 A1 | 3/2010 | Lakshmanan |
| 2010/0238288 A1 | 9/2010 | Klaemer et al. |
| 2017/0050553 A1 | 2/2017 | Peacock et al. |

\* cited by examiner

CAMERA LIGHT

CROSS REFERENCE TO RELATED APPLICATIONS

This application is a continuation of U.S. patent application Ser. No. 15/346,379, filed Nov. 8, 2016, now U.S. Pat. No. 10,414,324, which is a continuation of U.S. patent application Ser. No. 13/374,433, filed Dec. 28, 2011, now U.S. Pat. No. 9,497,421, which is a continuation of U.S. patent application Ser. No. 12/181,058, filed Jul. 28, 2008, now abandoned, all of which are entitled "CAMERA LIGHT," which claims the benefit of U.S. Provisional Application No. 60/952,106, filed Jul. 26, 2007, entitled "CAMERA WITH MARKER LIGHT." The entire disclosures of each are incorporated herein by reference in their entirety.

BACKGROUND OF THE INVENTION

The invention relates to camera systems which may be adapted for various uses.

As vehicles have become relatively more sophisticated, substantial development work has occurred with respect to safety features for vehicles. For example, one problem which has existed for a substantial period of time relates to the capability of a driver to maneuver a vehicle relative to external obstacles. For this reason, side and rear view mirrors have been in use for a number of years. However, dependent upon the type, size and overall shape of a vehicle, mirrors having image surfaces visual to a driver often cannot "pick up" images of obstacles presenting safety concerns for the driver. That is, vehicular mirrors often must be positioned on vehicles in a manner so that proverbial "blind spots" still occur for the driver. For a number of various types of vehicles, such as semitrailer trucks, waste hauling trucks and the like, these blind spots can be relatively large.

To alleviate these problems which cannot readily be solved by vehicle mirror design, it has become known to employ what could be characterized as "real time" cameras positioned at various locations on a vehicle. Such cameras, for example, may be directed to a lower rear area behind a vehicle which often represents a blind spot with respect to side and rear view mirrors. These video cameras are often directly connected to video monitors within the cab or cockpit of the vehicle, in a manner such that the monitors are readily visible to the driver. During a backup or similar procedures, these cameras can facilitate maneuvering of the vehicle by the driver so as to avoid external obstacles.

However, problems may exist with respect to known types of video cameras.

SUMMARY OF THE INVENTION

One aspect of the present disclosure is a camera light assembly for motor vehicles. The camera light assembly includes a housing having an outer surface, an opening in the outer surface, an inner surface, and a mounting structure configured to connect the housing to an existing vehicle light mount. The camera light assembly may further include a camera secured to the housing. The camera may include an outer end having a lens and an inner end opposite the outer end. The camera may be disposed at least partially in the opening of the housing, such that the inner end protrudes inwardly and the lens is in an exposed configuration in which the lens is not covered. The camera light assembly may include a light assembly having at least one light source inside the housing. The at least one light source is configured to illuminate at least a portion of the outer surface of the housing. An electrical power line may be operably connected to the at least one light source to provide power. The camera light assembly is configured to be mounted to a vehicle by connecting the mounting structure of the housing to an existing vehicle light mount for a required vehicle light. The mounting structure of the light assembly may optionally comprise an outwardly extending lip, wherein the lip is configured to be positioned adjacent an outer surface of the vehicle adjacent the existing vehicle light mount when the camera light assembly is mounted to a motor vehicle. The camera light assembly may optionally include a power and video camera cable operably connected to the camera to transmit power and images. The power and video camera cable is, optionally, not connected to the light assembly. The electrical power line is, optionally, not connected to the camera assembly. When configured in this way, the camera can be disassembled from the light assembly without disconnecting the camera cable from the electrical power line.

Another aspect of the present disclosure is a camera light assembly for vehicles including a light assembly having a body having an outer surface and a mounting structure that is configured to connect the body to an existing vehicle light mount for a required vehicle light. The body includes a camera support structure, and the body is configured to receive at least one light source inside the body. At least a portion of the body comprises a light-transmitting material whereby the at least one light source illuminates at least a portion of the outer surface of the body when the light source is actuated. The camera light assembly includes a camera assembly that is removably secured to the body and engages the camera support structure of the body. The camera assembly includes a camera having an outer end having a lens, and an inner end that is opposite the outer end. A power and video camera cable is connected to the camera to transmit power and images. The power and video camera cable is, optionally, not connected to an electrical power line of a light source, such that the camera assembly can be disassembled from the housing without disconnecting the camera cable from an electrical power line of a light source. The camera lens is optionally disposed outside of the body. The mounting structure of the light assembly optionally comprises an outwardly extending lip. The outer side of the body may comprise an opening, and the camera may include a lens aligned with the opening, such that the lens is not disposed inside the body. The body may comprise a housing having a front side wall, and the camera support structure may comprise a cylindrical inner surface extending inwardly from the front side wall to define a passageway connected to the opening in the outer side of the housing. At least a portion of the camera may be disposed in the passageway. The camera may, optionally, include a retaining lip that engages the outer side of the housing and limits inward movement of the camera in the passageway. The camera may, optionally, include a body having threads, and a lock member having at least one thread configured to engage the threads of the camera body to limit movement of the camera in the passageway. The camera optionally includes a cylindrical outer surface that is configured to slidably engage the cylindrical inner surface of the housing whereby the camera can be disassembled from the housing upon removal of the at least one threaded lock member. The inner end of the camera optionally protrudes from the inner side of the body.

These and other features, advantages, and objects of the present invention will be further understood and appreciated by those skilled in the art by reference to the following specification, claims, and appended drawings.

DETAILED DESCRIPTION

Figure 1:
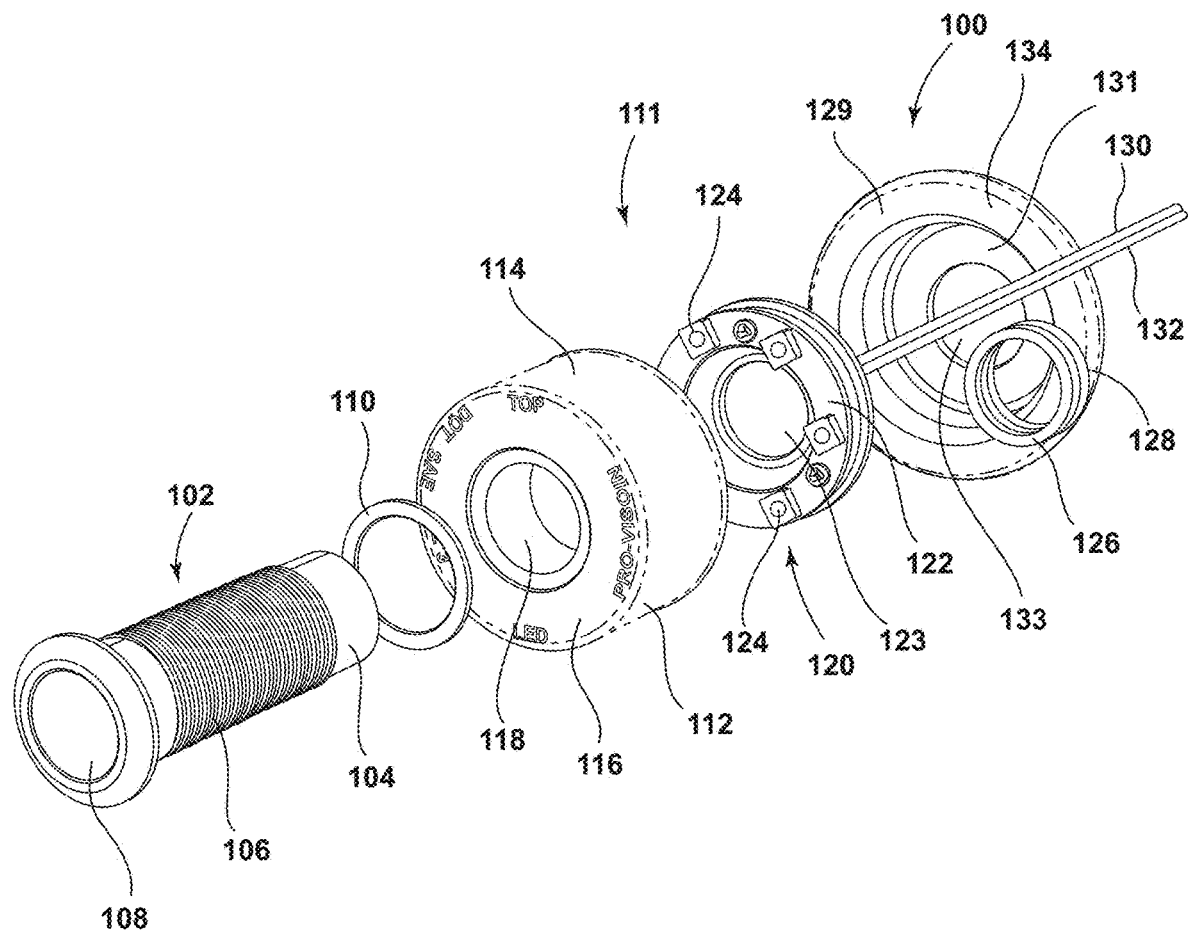
FIG. 1 is a perspective and exploded view showing the various components of a camera light assembly in accordance with the invention.

The principles of the invention are disclosed, by way of example, in a camera light assembly 100 as described in subsequent paragraphs herein and illustrated in FIGS. 1-4. Although the general concepts of camera systems are well known for use with various types of vehicles, camera light assemblies in accordance with the invention provide substantial advantages over the known prior art. One concept of the camera light assemblies in accordance with the invention relates to the use of illumination used with the camera. More specifically, the camera portion of the camera light assembly is effectively associated with the structure comprising means for generating illumination. In accordance with certain aspects of the invention, the camera portion of the assembly may be received within the body of the light or other means for illumination. Still further, in accordance with other concepts of the invention, the electrical circuitry of the camera portion of the assembly is separate and independent from the electrical circuitry associated with the light portion of the assembly. In addition, in accordance with further concepts which may be associated with the invention, the mechanical structures of the camera portion of the assembly and the light portion of the assembly may be coupled or otherwise releasably secured together. However, at the same time, they can be separately disassembled, so that if a camera portion becomes defective or otherwise fails, it can be replaced without the necessity of replacing the entirety of the camera light assembly. Correspondingly, the light portion of the assembly can also be replaced in the event of defaults or failures, without requiring replacement of the camera portion of the assembly. This advantage is provided through both the electrical and the mechanical "independence" of the separate portions of the assembly.

In accordance with another concept associated with the invention, the illumination may be provided by a series of LED lights. Still further, an additional concept in accordance with certain aspects of the invention relates to requirements for lenses. More specifically, with the structures associated with camera light assemblies in accordance with the invention, there is no requirement (and thus no disadvantages) of having the lens which covers the illumination also covering the camera. This absence of requiring lens coverage over the camera may reduce the quantity of illumination required for use of the camera, and substantially enhance the images produced by the camera. Also, it permits the camera to be positioned so as to facilitate increasing the viewing angle and scope of the image.

Still further, other concepts associated with camera light assemblies in accordance with the invention should be noted. Specifically, it is possible to provide for remote cameras which have their own illumination or are otherwise sufficiently powerful so as to require very little illumination. As an example, an infra-red camera could be utilized.

However, as is well known, vehicles of various types require tail or other types of lights in the rear portions of the vehicles. Also, relatively large vehicles, such as trucks and the like, often require lighting structures on the sides and other areas of the vehicle. In the following paragraphs, references are made to a marker light assembly 111 having a light housing 112 and light circuitry 120. One concept which can be an advantage in accordance with certain aspects of the invention relates to the fact that the light components which are associated with the camera light assemblies in accordance with the invention may be the lights which would be required for use with the vehicles, independent of use of any remote cameras. Accordingly, one aspect of the invention is that the requirement for having certain lighting components positioned at certain locations on the vehicles is taken advantage of with respect to using these same lighting components to provide illumination for the remote cameras. This reduces the need for providing cameras which can achieve a sufficient amount of brightness and resolution without any separate means for illumination. That is, the conventional requirement and positioning of light components can be taken advantage of for a "secondary purpose" of providing illumination for the camera structures in accordance with the invention.

Figure 2:
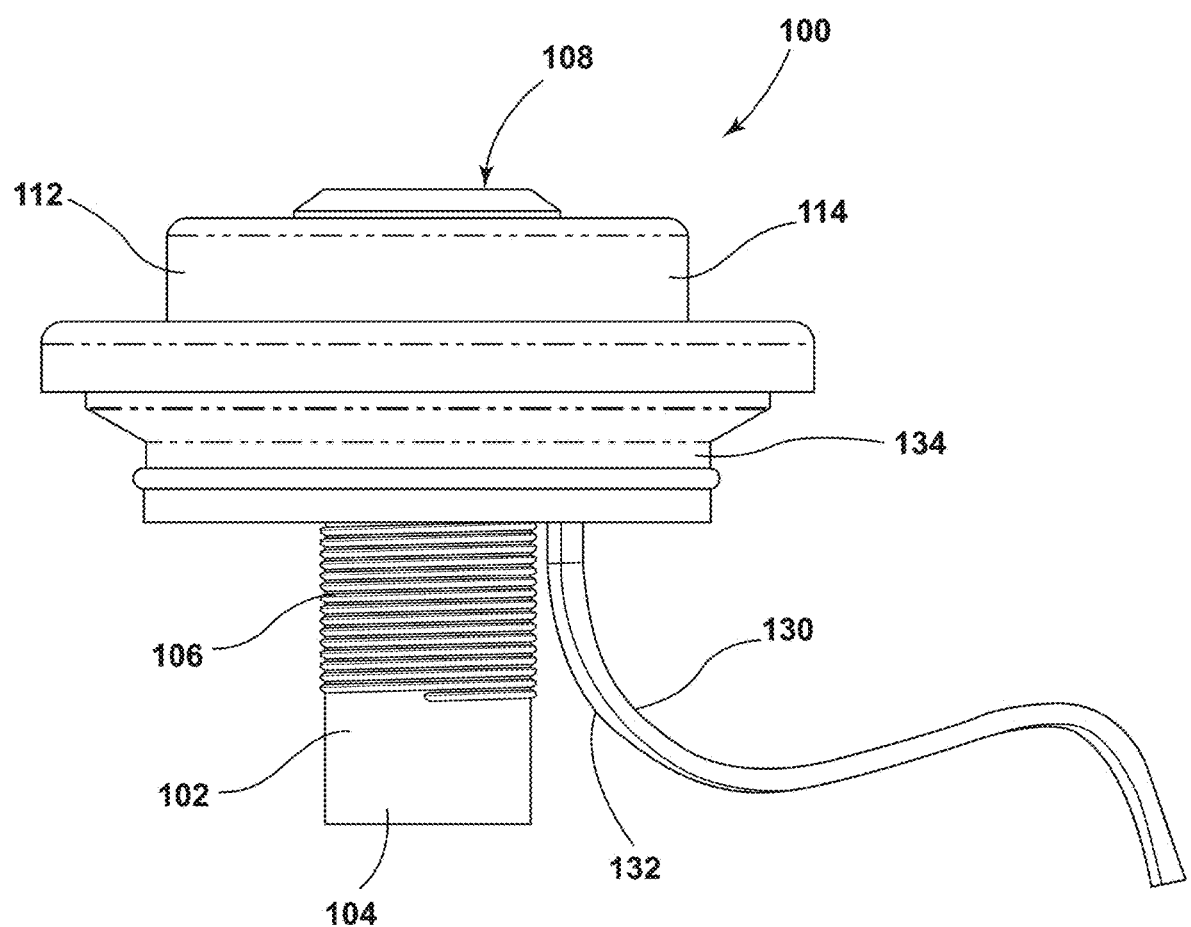
FIG. 2 is a side, elevation view of the fully assembled camera light assembly illustrated in FIG. 1.
Figure 3:
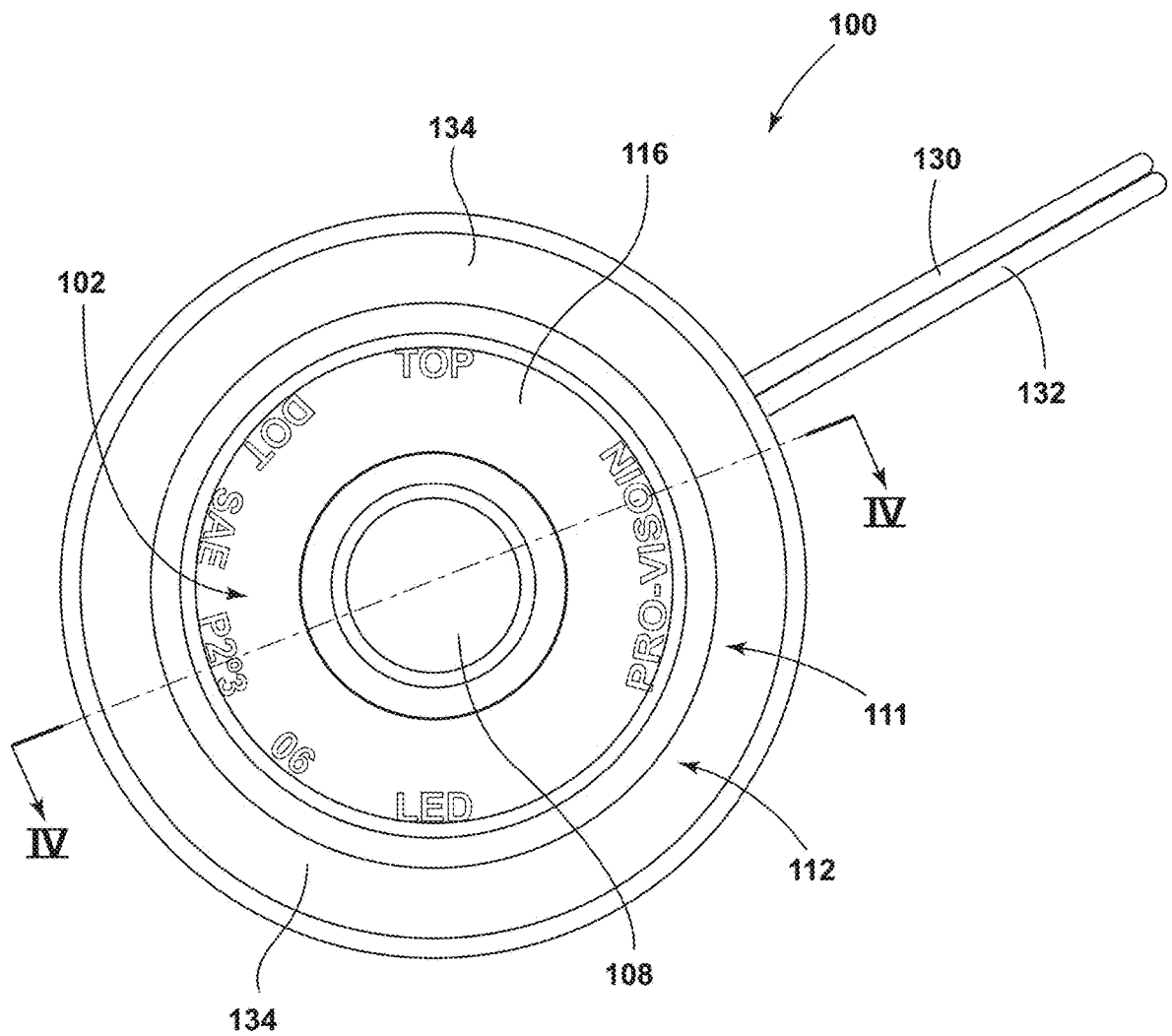
FIG. 3 is a plan view of the camera light assembly illustrated in FIG. 1, and in a fully assembled state.
Figure 4:
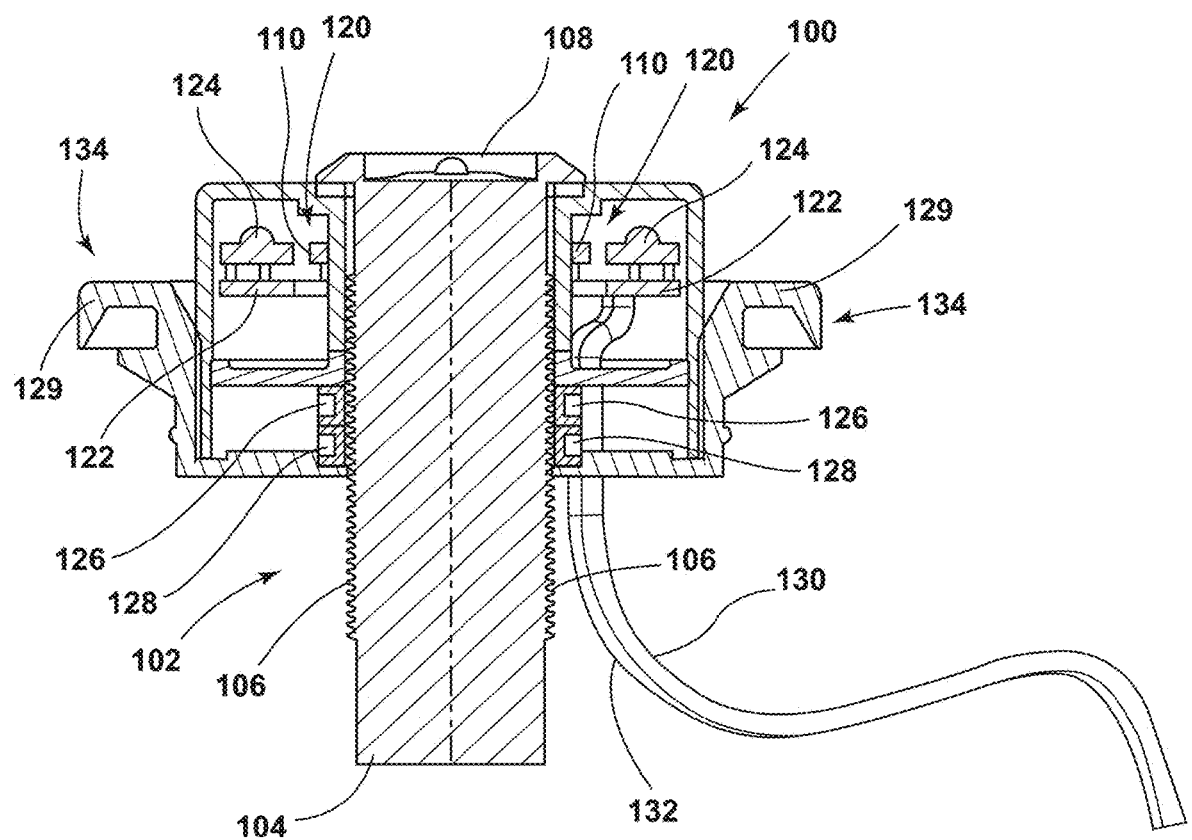
FIG. 4 is a side, sectional view of the camera light assembly illustrated in FIG. 1, and taken along section lines IV-IV of FIG. 3.

Turning to the drawings, FIGS. 1-4 illustrate an example embodiment of a camera light assembly I 00 in accordance with the invention. Specifically, FIG. 1 is an exploded view of the camera light assembly 100. FIG. 2 is a side, elevation view of the camera light assembly 100 in a fully assembled state. FIG. 3 is a plan view of the camera light assembly 100, while FIG. 4 is a side, sectional view of the camera light assembly 100, taken along section lines IV-IV of FIG. 3. With reference to the drawings, the camera light assembly 100 includes a camera 102 which may be in the form of a relatively small video camera or the like. The camera 102 can be electrically connected to a camera cable 130. The camera cable 130, in turn, can be connected to video projection means (not shown) or the like, so as to provide a visual image to, for example, a driver in a vehicle. The camera or camera assembly 102 includes, in this particular embodiment, a cylindrical body 104 having a knurled or threaded portion 106. The internal circuitry of the camera assembly 102 includes a camera which obtains images through a forward lens 108. As apparent from the drawings, the camera assembly 102 will receive power through the camera cable 130, which is substantially "independent" of components associated with electrical circuitry of the light portion of the camera light assembly 100. With reference particularly to FIGS. 1 and 4, the camera assembly 102 also includes a camera gasket 110. When assembled, the body 104 of the camera assembly 102 is received within the camera gasket 110.

In addition to the camera assembly 102, the camera light assembly 100 also includes a marker light assembly 111. Again, with reference primarily to FIGS. 1 and 4, the marker light assembly 111 provides a means for generating illumination within the spatial area 15 for which video images are being received through the camera assembly 102. In the particular embodiment shown in the drawings, the marker light assembly 111 includes a light housing 112. The light housing 112 includes a cylindrical or annular portion 114. A front surface 116 is coupled to or integral with the cylindrical portion 114. As with conventional light housings, the light housing 112 can have a relative transparency and color hue appropriate for providing an optimum level of illumination and resolution for the images received through the camera assembly 102. The light housing 112 also includes a cylindrical aperture 118. As shown in particular in FIGS. 2, 3 and 4, the body 104 of the camera assembly 102 is received within the aperture 118 of the light housing 112.

With reference again to FIGS. 1 and 4, the marker light assembly 111 includes light circuitry 120 adapted to be received within the light housing 112. The light circuitry 120 includes a conventional base 122. A series of lights 124 may be spaced apart on a forward surface of the base 122. The lights 124 may be in the form of LED's or similar means for illumination.

When assembled, the light circuitry 120 is received within the light housing 112 of the marker light assembly 111. The camera gasket 110 is received on the body 104 of the camera assembly 102, and the camera assembly 102 is then received within the aperture 118 of the light housing 112. For purposes of further receiving the body 104 of the camera assembly 102, the base 122 of the light circuitry 120 may also include an aperture 123. With the camera assembly 102 extended through the apertures 118 and 123 of the light housing 112 and light circuitry 120, respectively, camera lock rings 126 and 128 can be threadably received on the knurled or threaded portion 106 of the body 104 of the camera assembly 102. The camera lock rings 126, 128 are utilized to releasably secure the camera assembly 102 to the marker light assembly 111.

If desired, for purposes of assembly and attachment to a vehicle or the like, the camera light assembly 100 can also include a grommet 134 having a structure and configuration primarily shown in FIGS. 1 and 4. The grommet 134 can include a rim 129, inner recess 131 within the rim 129, and an aperture 133 extending through the inner recess 131. The aperture 133 can be utilized to receive the lower portion of the body 104 of the camera assembly 102.

In accordance with all of the foregoing, an assembly 100 has been described and illustrated in accordance with the invention which provides a number of advantages over the prior art. The assembly 100 is a camera and light combination configuration. Advantageously, a cover or housing is provided which shields the light source. However, the lens or lens cover does not extend in a manner which covers or otherwise encloses the camera. In part, this is advantageous in that relatively better resolution of images produced by the camera 102 can be achieved. Also, illumination intensity can be relatively smaller. Further, the front of the camera is substantially flush with the light source surrounding the camera and other structural components of the assembly 100. This flush configuration is in contrast to a number of known systems where the camera may be recessed relative to other structure. If the camera or image sensor is recessed, the scope of the viewing angle is reduced. However, with this concept of the assembly 100 being provided in accordance with the invention, the flush design for the camera or image sensor allows for a relatively wider angle of image sensing.

In addition to the foregoing, this configuration of a combination of a video camera and a light source represents a structure where the camera or image sensor is actually "built into" the structure for the light source. That is, the light source can provide for various types of functions, independent of image sensing. For example, the light source may represent the capability of various types of vehicle signaling functions.

In addition to the foregoing, it is noted that the camera assembly 102 and the marker light assembly 111 are essentially electrically and mechanically "independent" although the camera assembly 102 is releasably coupled to the marker light assembly 111 when assembled. This independence provides for facilitating manufacture. In addition, and as earlier stated, replacement is relatively easy and relatively less expensive, since defects or failures associated with the camera assembly 102 would not require replacement of the entirety of the camera light assembly 100. Correspondingly, defects or failures associated with the electrical or mechanical components of the marker light assembly 111 would not require replacement of the camera assembly 102.

In accordance with certain aspects of the forgoing, the camera light assembly can be characterized as being adapted to provide visual images to a user where the user is remote from the camera light assembly. The user is also remote from an area of what can be characterized as a "visual range" of the camera light assembly. The marker light assembly (111) can be characterized as having "light means" in the form of the LED lights 124 for providing illumination for the visual range of the camera light assembly 100. In addition, the light cable 132 can be characterized as providing a means for powering the lights 124. Of course, it should be apparent that the light cable 132 can be utilized for switching functions or the like, and that the lights 124 comprising the lighting means could be powered by means such as low voltage battery power or the like.

The camera assembly 102, with the camera cable 130, can be characterized as having a cable 130 which provides for a camera "electrical means" so as to provide a transmission path from the camera assembly 102 for purposes of transmitting visual images generated by the camera assembly to a remote user and remote equipment (not shown). The camera cable 130 can also be utilized to provide power to the camera assembly 102, and can be characterized as essentially comprising "camera electrical means." Also, power for the camera assembly 102 may be provided by means of batteries or the like located within the camera assembly 102 itself. Such batteries (not shown) can also be characterized as part of the camera electrical means. Still further, the camera lock rings 126, 128 can be characterized as providing a means for releasably securing the camera assembly 102 to the marker light assembly 111. It should also be noted that with respect to the features of the invention which consist of the electrical and mechanical independence, it may be possible to actually couple or otherwise releasably secure the camera assembly 102 to the marker light assembly 111 at other positions other than through the aperture 118. Further, however, the capability of receiving the camera assembly 102 within the marker light assembly 111 is an advantageous feature in accordance with certain concepts of the invention.

It will be apparent to those skilled in the pertinent arts that other embodiments of camera light assemblies in accordance with the invention may be designed. That is, the principles of these assemblies are not limited to the specific embodiment described herein. Accordingly, it will be apparent to those skilled in the art that modifications and other variations of the above-described illustrative embodiment of the invention may be effected without departing from the spirit and scope of the novel concepts of the invention.

The invention claimed is:

1. A camera light assembly for motor vehicles comprising:
   a housing including an outer surface and an opening in the outer surface, an inner surface and a mounting structure configured to connect the housing to an existing vehicle light mount;
   a camera secured to the housing, wherein the camera includes an outer end having a lens and an inner end opposite the outer end, wherein the camera is disposed at least partially in the opening of the housing such that the inner end protrudes inwardly and the lens is in an exposed configuration in which the lens is not covered;

a light assembly including at least one light source inside the housing whereby the at least one light source illuminates at least a portion of the outer surface of the housing;

an electrical power line operably connected to the at least one light source; and wherein the camera light assembly is configured to be mounted to a vehicle by connecting the mounting structure of the housing to an existing vehicle light mount for a required vehicle light.

2. The camera light assembly of claim 1, wherein:

the mounting structure of the light assembly comprises an outwardly-extending lip, wherein the lip is configured to be positioned adjacent an outer surface of the vehicle adjacent the existing vehicle light mount when the camera light assembly is mounted to a vehicle.

3. The camera light assembly of claim 1, including:

a power and video camera cable operably connected to the camera to transmit power and images.

4. The camera light assembly of claim 3, wherein:

the power and video camera cable is not connected to the light assembly, and the electrical power line is not connected to the camera assembly whereby the camera can be disassembled from the light assembly without disconnecting the camera cable from the electrical power line.

5. A camera light assembly for vehicles, comprising:

a light assembly having a body having an outer surface and a mounting structure configured to connect the body to an existing vehicle light mount for a required vehicle light, wherein the body includes a camera support structure, the body configured to receive at least one light source inside the body and wherein at least a portion of the body comprises a light-transmitting material whereby the at least one light source illuminates at least a portion of the outer surface of the body;

a camera assembly removably secured to the body and engaging the camera support structure of the body, wherein the camera assembly includes a camera having an outer end having a lens and an inner end opposite the outer end;

a power and video camera cable connected to the camera to transmit power and images;

and wherein the power and video camera cable is not connected to an electrical power line of a light source such that the camera assembly can be disassembled from the housing without disconnecting the camera cable from an electrical power line of a light source.

6. The camera light assembly for vehicles of claim 5, wherein:

the camera lens is disposed outside of the body.

7. The camera light assembly for vehicles of claim 5, wherein:

the mounting structure of the light assembly comprises an outwardly-extending lip.

8. The camera light assembly for vehicles of claim 5, wherein:

the outer side of the body comprises an opening; and the camera includes a lens aligned with the opening such that the lens is not disposed inside the body.

9. The camera light assembly for vehicles of claim 8, wherein:

the body comprises a housing having a front side wall; and the camera support structure comprises a cylindrical inner surface extending inwardly from the front side wall to define a passageway connected to the opening in the outer side of the housing.

10. The camera light assembly for vehicles of claim 9, wherein:

at least a portion of the camera is disposed in the passageway.

11. The camera light assembly of claim 10, wherein:

the camera includes a retaining lip that engages the outer side of the housing and limits inward movement of the camera in the passageway.

12. The camera light assembly of claim 11, wherein:

the camera includes a body having threads; and including:

at least one threaded lock member configured to engage the threads of the camera body to limit movement of the camera in the passageway.

13. The camera light assembly of claim 12, wherein:

the camera includes a cylindrical outer surface that slidably engages the cylindrical inner surface of the housing whereby the camera can be disassembled from the housing upon removal of the at least one threaded lock member.

14. The camera light assembly of claim 5, wherein:

the inner end of the camera protrudes from the inner side of the body.

15. A camera light assembly for vehicles, comprising:

a light assembly having a body having an outer surface and a mounting structure configured to connect the body to a vehicle light mount, wherein the body includes a camera support structure, the body configured to receive at least a portion of at least one light source at least partially inside the body, and wherein at least a portion of the body comprises a light-transmitting material whereby at least a portion of the outer surface of the body can be illuminated by a light source received at least partially inside the body;

a camera assembly removably secured to the body and engaging the camera support structure of the body, wherein the camera assembly includes a camera having an outer end having a lens and an inner end opposite the outer end;

a video camera cable connected to the camera to transmit images.

16. The camera light assembly for vehicles of claim 15, wherein:

the video camera cable is configured to transmit both images and power;

the power and video camera cable is not connected to an electrical power line of a light source such that the camera assembly can be disassembled from the housing without disconnecting the camera cable from an electrical power line of a light source.

17. The camera light assembly for vehicles of claim 15, wherein:

the camera lens is disposed outside of the body.

18. The camera light assembly for vehicles of claim 15, wherein:

the mounting structure of the light assembly comprises an outwardly-extending lip.

19. The camera light assembly for vehicles of claim 15, wherein:

the outer side of the body comprises an opening; and the camera includes a lens aligned with the opening such that the lens is not disposed inside the body.

20. The camera light assembly for vehicles of claim 19, wherein:
   the body comprises a housing having a side wall; and
   the camera support structure comprises a cylindrical inner surface extending inwardly from the side wall to define a passageway connected to the opening in the outer side of the housing.

* * * * *